United States Patent [19]

Minorikawa et al.

[11] 4,135,186
[45] Jan. 16, 1979

[54] LIQUID LEVEL DETECTING APPARATUS

[75] Inventors: Hitoshi Minorikawa, Mito; Yukio Hohsho, Hiroshima; Sadayasu Ueno, Katsuta, all of Japan

[73] Assignee: Hitachi, Ltd., Japan

[21] Appl. No.: 771,177

[22] Filed: Feb. 23, 1977

[51] Int. Cl.² ............................................. G08B 21/00
[52] U.S. Cl. ..................................... 340/622; 73/295; 340/59
[58] Field of Search ................. 340/244 R, 244 C, 59; 73/295

[56] References Cited
U.S. PATENT DOCUMENTS

| | | | |
|---|---|---|---|
| 3,407,840 | 10/1968 | Finnegan | 361/165 X |
| 3,500,367 | 3/1970 | Fremont et al. | 340/228 R |
| 3,600,946 | 8/1971 | Ziemba et al. | 340/244 R X |
| 3,878,541 | 4/1975 | Dodson | 340/244 R |

FOREIGN PATENT DOCUMENTS

| | | | |
|---|---|---|---|
| 332638 | 10/1958 | Switzerland | 361/165 |
| 1007083 | 10/1965 | United Kingdom | 340/244 R |

*Primary Examiner*—John W. Caldwell, Sr.
*Assistant Examiner*—Daniel Myer
*Attorney, Agent, or Firm*—Craig & Antonelli

[57] ABSTRACT

A liquid level detecting apparatus comprises a thermistor adapted to generate heat by current flowing therethrough, wherein the liquid level is sensed by detecting a current value at the thermistor which varies in dependence on a variation in temperature of the thermistor, which temperature in turn varies in dependence on whether the thermistor is immersed in the liquid or exposed to air. A relay coil is provided in series to the thermistor and disposed within a casing together with the latter so that the variation in temperature of the liquid may be transmitted to the relay coil, wherein the variation in the current value at the thermistor caused by the temperature variation of liquid is corrected by the variation of the resistance of the relay coil.

7 Claims, 7 Drawing Figures

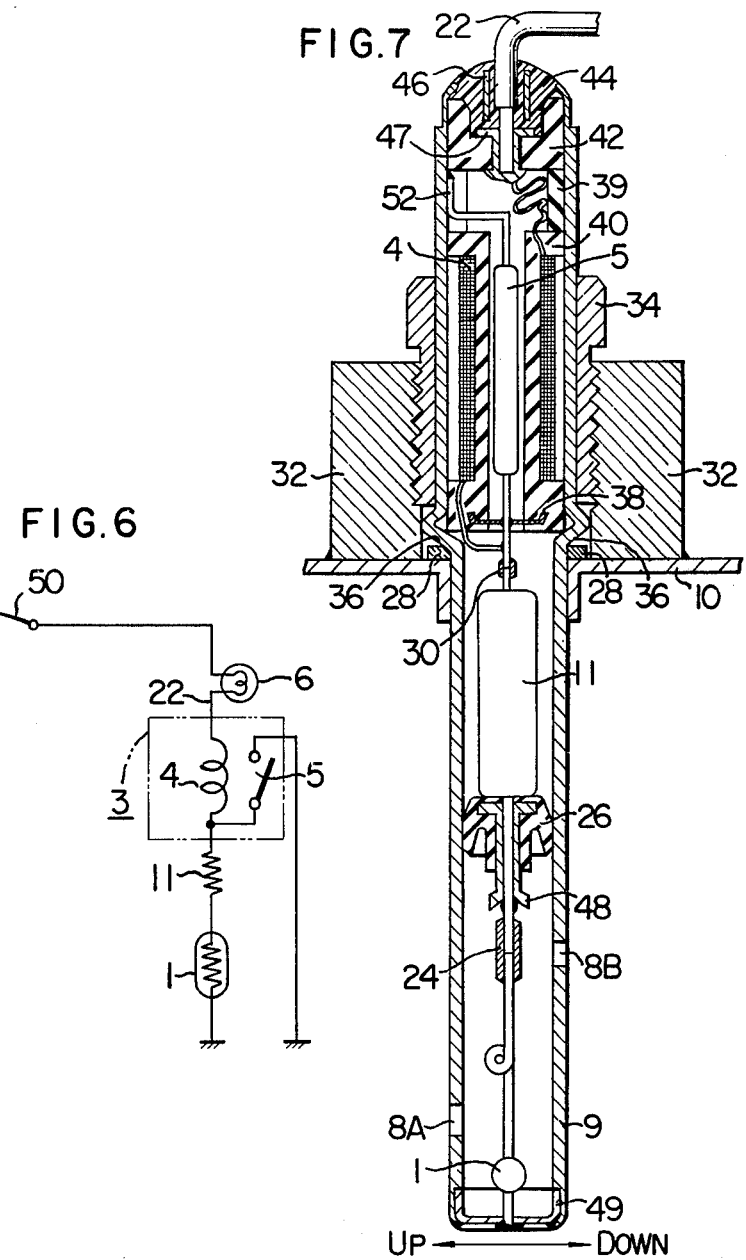

LIQUID LEVEL DETECTING APPARATUS

The present invention relates in general to an apparatus for detecting a liquid level of a liquid pool and in particular to a liquid level detecting apparatus suited especially for use to detecting a liquid level of engine oil in a motor vehicle or car.

There have been hitherto known various liquid level detectors of the above described type in which a thermistor is employed as a sensing element. For example, in a typical liquid level detector of the prior art, a thermistor is installed in a gasoline tank and adapted to be supplied with a very small amount of electric current so that the thermistor may generate heat (self-heating). Since the temperature of the thermistor at the time when it is immersed in gasoline is differed from the temperature when the thermistor is in the air due to difference in the heat dissipation effect, the resistance of the thermistor will undergo a corresponding variation when the environmental condition changes. Such behavoir of the thermistor is utilized for detecting the liquid level of gasoline. In this connection, it will be recognized that the resistance of the thermistor will vary significantly depending upon whether or not the thermistor is within a liquid the level of which is to be detected, assuming that the temperature of the liquid remains constant. On the contrary, a remarkable variation in the temperature of the liquid itself will make the liquid level detection very difficult.

By way of example, in the case of the liquid level detection required in motor vehicles, the liquid or gasoline will experience a great variation in temperature at the time immediately after the vehicle has been started and after the vehicle has run for a predetermined duration. Besides the temperature of gasoline will vary depending on the seasons and places where the vehicle is driven. Under such circumstances, it becomes very difficult to discriminate that a rise in temperature of the thermistor is ascribable to the fact that the thermistor gets out of the liquid or the increased temperature of the liquid brings about the temperature rise in the thermistor. Accordingly, there is a demand for a liquid level detecting apparatus which can detect the liquid level with a high fidelity and accuracy independently of variation in temperature of the liquid.

Accordingly, an object of the invention is to provide a liquid level detecting apparatus which is capable of detecting a liquid level with a high accuracy even if temperature of liquid it self undergoes variation.

Another object of the invention is to provide a liquid level detecting apparatus which is suited for detecting the liquid level of engine oil for a motor car or vehicle.

Still another object of the invention is to provide a liquid level detecting apparatus which is capable of detecting the liquid level with a high fidelity and accuracy and which can be manufactured at low cost.

With these and other objects in view, according to one aspect of the invention, a thermistor having a negative temperature coefficient of resistance is mounted on a container adapted to accommodate therein a liquid to be detected at a predetermined height or level, and the thermistor is supplied with electric current through a resistance means having a resistance varying positively in dependence on variation in the liquid temperature, i.e. a resistor means having a positive temperature coefficient of resistance.

As hereinbefore described, when the thermistor is exposed from the liquid, the temperature thereof will increase due to the self-heating of the thermistor. Accordingly, there is a possibility that the thermistor itself is thermally destroyed or somehow damaged under the increased temperature. In order to prevent such undesirable phenomenon from occurring, it is preferred that a bypass circuit means is provided so as to inhibit the current supply to the thermistor when the lowered liquid level has been detected by the thermistor. For such bypass circuit means, a relay may be employed. The relay may comprises a coil which is formed of a thin conductor wire wound in a great number of turns and thus exhibits a positive temperature coefficient of resistance. When the relay is so arranged that the temperature thereof is determined by the temperature of liquid to be detected and the thermistor is supplied with current through the relay, it is possible to detect the liquid level by measuring the current flowing through the relay coil. With such circuit arrangement, protection of the thermistor and compensation for the liquid temperature may be concurrently assured with the whole detecting system being implemented in a compact structure.

It has been also found that a combination of the thermistor having a negative temperature coefficient with a means having a positive temperature coefficient allows detection of both the liquid level and an abnormal rise of the liquid temperature. When the invention is applied to the liquid level detection of engine oil for a motor car, it should be taken into consideration that the temperature of engine oil would be lowered to minus (−) 30° C in dependence upon the place where the motor car is driven. On the other hand, the engine oil will often undergo a temperature rise in the order of +140° C during the operation or running. Under these circumstances, the thermistor will then naturally be subjected to a temperature variation, which however should not provide a cause for erroneous operation. When the thermistor is combined with a means having a positive temperature coefficient of resistance such as a relay for example as described above, the liquid temperature will be transmitted to the relay coil, whereby correction is made for the liquid temperature. For example, when abnormal temperature rise occurs in the engine oil for the reason of an insufficient quantity of cooling water or the like, such temperature rise can be detected by the thermistor since the current flowing therethrough will be correspondingly increased even if the thermistor is in the state of being immersed in the liquid. In this manner, the liquid level can be detected with a high accuracy without being influenced by the temperature variation of the engine oil so far as the temperature of the engine oil is in a normal temperature range below +140° C for example. On the other hand, when the temperature of engine oil increases abnormally, a warning signal can be produced even if the liquid level is in a normal range.

The above and other objects, features and advantages of the invention will become more apparent from detailed description of embodiments of the invention taken in conjunction with the accompanying drawings, in which:

FIG. 6 is a circuit diagram showing an arrangement of a liquid level sensing apparatus according to another embodiment of the invention; and FIG. 7 is a sectional view showing a structure of an engine oil level detecting apparatus implementing the circuit arrangement shown in FIG. 6.

Figure 1:
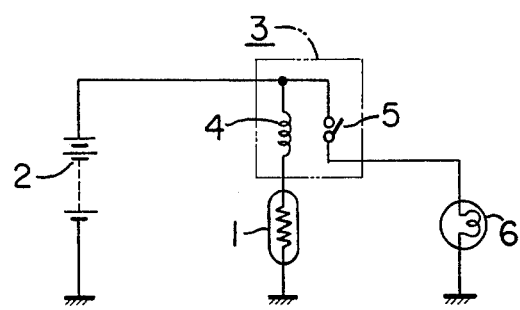
FIG. 1 is a circuit diagram showing an arrangement of a liquid level detecting apparatus according to an embodiment of the invention.
Figure 2:
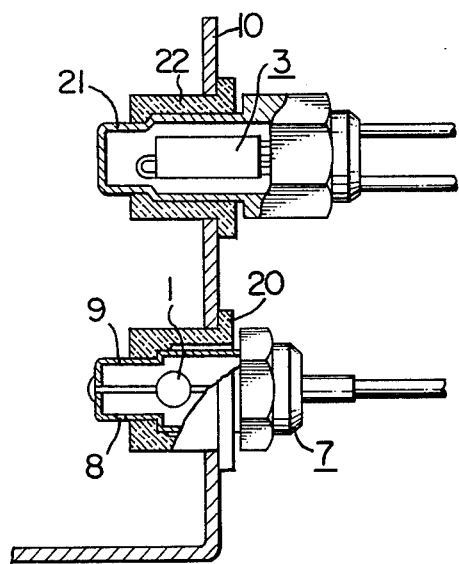
FIG. 2 shows in a partially broken sectional view a structure of the liquid level detecting apparatus shown in FIG. 1.

Referring to the drawings and in particular to FIGS. 1 and 2 which show an embodiment of the liquid level detecting apparatus according to the invention as applied to the liquid level sensor for engine oil of a motor car. In FIG. 1, a thermistor 1 having a negative temperature coefficient of resistance is connected in series to an exciting coil 4 of a relay 3 having a positive temperature coefficient of resistance and hence to a power supply source 2 such as a battery. A normally open contact 5 of the relay 3 is connected in series to a warning device 6 such as a lamp.

FIG. 2 shows the thermistor 1 and the relay 3 in the state installed in an oil pan 10 of the engine. It will be noted that the oil pan 10 is fixedly secured onto a vehicle body (not shown) and constantly supplied with oil.

Thermistor sensor 7 is composed of the thermistor 1, a casing 9 accommodating the thermistor 1 and a grommet 20 for mounting the casing 9 on the oil pan 10 in a thermally insulated manner. The casing 9 is provided with an oil supply aperture 8. The mounting position of the sensor 7 relative to the oil pan 10 is selected such that the sensor 7 is immersed in oil when oil is present in the oil pan 10 in a prescribed quantity, while the sensor 7 is exposed in the air when the quantity of engine oil is decreased below the prescribed quantity. The relay 3 is also located in a casing 21 extending through the wall of the oil pan 10, which casing 21 in turn is mounted on the oil pan 10 by means of a grommet 22 of a thermally insulating nature. The position of the relay 3 is so selected that it may be influenced by the temperature prevailing in the vicinity of the thermistor 1.

In the case of the embodiment shown in FIGS. 1 and 2, the relay 3 is mounted on the oil pan 10 above the thermistor sensor 7. Although it is most preferred that the thermistor sensor 7 and the relay 3 are secured to the oil pan 10 in this manner, it will be appreciated that the relay 3 may be installed at any suitable location so far as the ambient temperature thereof has a predetermined correlation with the temperature of the liquid contained in the oil pan 10. For example, the relay 3 may be positioned at a place to which the temperature of engine-cooling water is transmitted when the thermistor sensor 7 is mounted on the oil pan of the engine.

Next, operation of the oil level detecting apparatus of the above structure will be described. It is assumed that a sufficient quantity of engine oil is contained in the oil pan 10 with the thermistor 1 immersed in the oil and that the thermistor 1 is supplied with electric current from the power supply source 2 composed of a battery of 12 V through the exciting coil 4 of the relay 3. Then, the heat generated by the thermistor 1 will be absorbed by the engine oil, and the temperature of the thermistor remains at a relatively small value. Under these conditions, the thermistor 1 exhibits a relatively large electric resistance, as a result of which the electric current flowing through the exciting coil 4 of the relay 3 remains at a sufficiently low value to maintain the normally open contact thereof in the open state thereby to prevent the warning lamp 6 from being lit. On the other hand, when the ambient temperature of the thermistor 1, i.e. the temperature of the engine oil is increased, the temperature of the thermistor will be correspondingly increased with the resistance value thereof being lowered. Thus, the voltage across the terminals solderd the exciting coil 4 of the relay 3 is also correspondingly increased.

Figure 3:
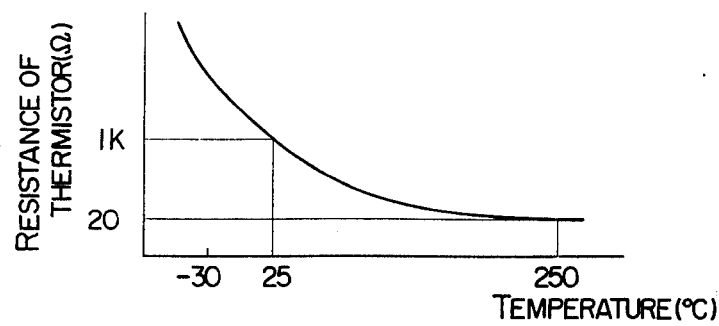
FIG. 3 illustrates graphically the characteristics of a thermistor.

A typical example of the characteristic relation between the temperature and the resistance of a thermistor is graphically illustrated in FIG. 3. As will be seen therefrom, the resistance of the thermistor is of 1 KΩ at the temperature of +25° C, while it decreases to about 20 Ω at +250° C.

In the normal operation of an engine, the temperature of the engine oil may attain about 140° C. Accordingly, if the resistances of the relay exciting coil 4 and the thermistor 1 are so selected that the relay 3 may be actuated at the voltage applied to the coil 4 when the engine oil temperature exceeds +140° C to attain +160° C as is in the case of an over-load, over-heating of the engine or insufficiency of cooling water, the normally open contact 5 is closed thereby to produce a warning signal for the driver by lighting the lamp 6.

Figure 4:
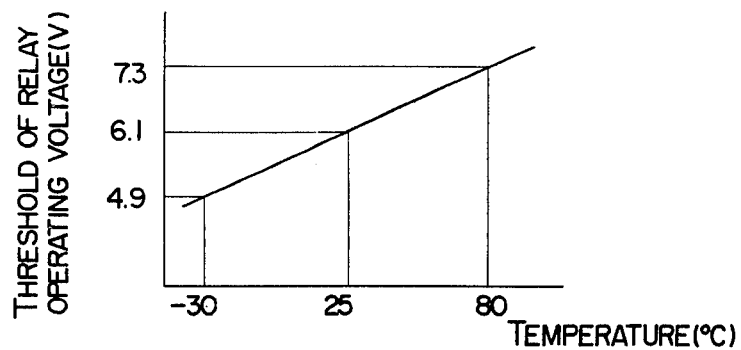
FIG. 4 illustrates graphically the operation characteristics of a relay.

Next, it is assumed that the quantity of the engine oil is decreased for some causes, so that the thermistor 1 is exposed to air. At that time, the heat generated by the thermistor is dissipated only to the ambient air which has a poor thermal conductivity, the temperature of the thermistor per se will rapidly increase with the resistance thereof being steeply decreased as shown in FIG. 3, which will result in a rapid build-up of a high voltage across the exciting coil 4. When the voltage across the coil 4 exceeds the threshold of operating voltage of the relay 3, the normally open contact 5 is closed to light the warning lamp 6. In this connection, it is preferred to select the threshold of the operating voltage of the relay 3 as well as the respective resistances of the exciting coil 4 and the thermistor 1 in consideration of the operating conditions of the motor car such that the relay 3 may be actuated even at the ambient temperature on the order of −30° C and at the source voltage of 10 V. Further, when the thermistor 1 is immersed in the engine oil, the relay 3 should not be actuated even at the ambient temperature of +140° C and the source voltage of 14 V. In order to meet these two conditions, the temperature-versus-threshold of operating voltage characteristic of the relay such as shown in FIG. 4 should be optionally utilized. The characteristics shown in FIG. 4 is a typical one of a commercially available reed relay. In consideration of the practical operating conditions of a motor car, the relay may be actuated when the voltage applied to the exciting coil 4 exceeds 4.9 volts at the ambient air temperature of −30° C. On the other hand, in order to prevent the relay 3 from being actuated at the oil temperature of +140° C, the voltage applied across the exciting coil 4 should be lower than 7.3 volts in consideration of the fact that the ambient temperature of the relay 3 is increased to about +80° C.

In a most suitable practical example, the resistance of the relay coil 4 was about 52 Ω at +25° C with the temperature coefficient of about 0.36%/° C, while the resistance of the thermistor 1 was about 1 KΩ at +25° C, 15 to 20 Ω at the self-heating state in the air and 40 to 60 Ω in the immersed state in the engine oil.

Figure 5:
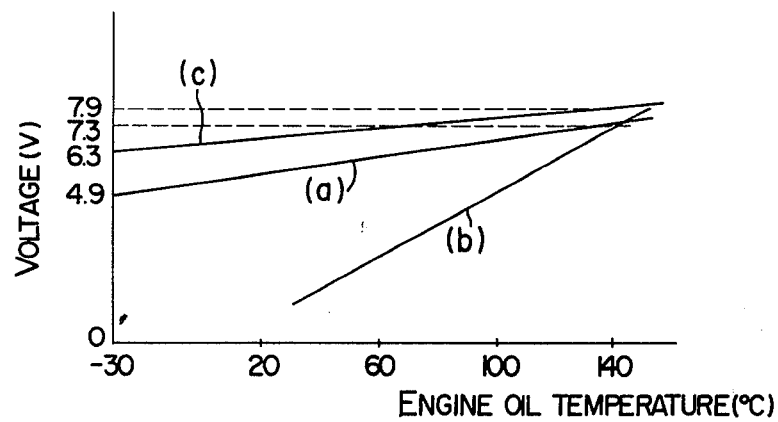
FIG. 5 illustrates graphically the characteristics of a liquid level detecting apparatus according to the invention as applied to the detection of engine oil level of a motor car.

The inventors of the application found that the above described conditions could be fulfilled by providing a certain correlation between the ambient temperature of the relay and that of the thermistor starting from the fact that variation occurred in the threshold of the operating voltage of the relay depending on the ambient temperature thereof. In this connection, reference should be made to FIG. 5. In the case of the illustrated embodiment, the relay 3 was mounted on the oil pan 10 in the vicinity of the thermistor sensor 7 with a view to providing a correlation between the ambient temperature of the exciting coil 4 of the relay 3 and that of the thermistor. With such an arrangement, the threshold of operating voltage of the relay 3 in response to the oil temperature in the oil pan 10 was 4.9 volts at −30° C and 7.3 volts at +140° C (the ambient temperature of the relay 3 was +80° C), as is represented by curve a in FIG. 5. When the relay 3 of such a characteristic was employed together with the thermistor 1 to constitute the senser circuit shown in FIG. 1, the voltage appearing across the relay coil when supplied from the source voltage of 14 V with the thermistor 1 immersed in the engine oil (the most unfavorable condition) behaved as represented by curve b in FIG. 5. As seen from the curves a and b, when the oil temperature within the oil pan was below +140° C the relay 3 was not actuated because the voltage applied across the coil 4, as represented by the curve b, was lower than the threshold of relay operating voltage represented by the curve a. When the oil temperature increased beyond +140° C, on the contrary, the voltage applied to the relay coil 4 became higher than the threshold of relay operating voltage thereby to actuate the relay 3 to close the normally open contact 5 so as to energize the warning lamp 6 indicating to the driver that the engine was in the over-loaded or over-heated or the like state. The behavoir of voltage appearing across the relay coil as a function of the oil temperature at the time when the thermistor 1 was exposed to air is represented by curve c in FIG. 5 under the worst unfavorable condition that the source voltage was 10 volts. As can be seen from the curve c, the voltage appearing across the relay coil 4 was 6.3 volts at the air temperature of −30° C within the oil pan and 7.9 volts at +140° C. In other words, the voltage appearing across the relay coil 4 in the temperature range of −30° C to +140° C was always higher than the threshold of the operating voltage of the relay 3. Accordingly, whenever the thermistor 1 is exposed to air as a result of the decreased quantity of engine oil, the relay 3 is actuated to close the normally open contact 5 so that the warning lamp 6 is lit to give a message to the driver that the engine oil is insufficient or decreased.

As will be understood from the foregoing description, in the case of the above described embodiment, a single thermistor sensor installed on the oil pan allows detection not only of the oil level but also of the abnormal rise in the oil temperature. This means that the invention makes it possible to realize a liquid level detecting apparatus having two kinds of detecting functions at lower costs as compared with the hitherto known sensor or detector of the same kind. Further, since the temperature range in which the liquid level detecting apparatus can be employed is as wide as of −30° C to +140° C, the detecting apparatus can be used widely as the detector for other liquids than engine oil. Additionally, since a single sensor element is sufficient for the satisfactory operation, the detecting apparatus can be manufactured inexpensively and installed with no positional limitation and without involving danger of leakage. Thus, according to the invention there is provided an in expensive liquid level detecting apparatus which can operate with an enhanced fidelity while maintenance requirements are significantly reduced.

FIG. 6 shows another modification of the liquid level detecting apparatus shown in FIG. 1. In this modification, a thermistor 1, a resistor 11, a relay coil 4 and an alarm lamp 6 are connected in series and current is supplied from a power source 2 through a key switch 50. With such a circuit arrangement, when the oil level is sufficiently higher than a predetermined level at which the relay 3 is to be actuated if the oil level is reduced to the predetermined level, the current supplied to the series circuit is not sufficient to light the lamp 6. When the oil level is reduced to the above-mentioned predetermined level, the temperature of the thermistor 1 will rise to increase the current supplied to the series circuit so as to actuate the relay coil 4 to close a normally open relay contact or read switch 5. The lamp 6 is lit by the current flowing through the relay coil 4 connected in series thereto.

In the case of this embodiment, the relay coil 4 formed of a thin insulated wire wound in a number of turns and having a positive temperature coefficient of resistance is connected in series to the thermistor 1 having a negative temperature coefficient of resistance through the resistor 11. In order to prevent erroneous operation in the detection of the liquid level such as the engine oil level as a result of variation in the liquid temperature, an element having a positive temperature coefficient of resistance may be inserted in place of the relay coil. In the illustrated embodiment, the relay coil 4 is employed with a view to protecting the thermistor.

When the thermistor is immersed in the liquid, the heat generated by the thermistor is dissipated to the liquid, so that the temperature of the former is retained at a predetermined value. On the other hand, when the thermistor is exposed to air, there may arise a danger that the thermistor should be thermally damaged due to the over-heating thereof. In order to evade such an undesirable phenomenon, a bypass circuit through the contact 5 is provided in this embodiment of the detecting apparatus. When the relay coil 4 is energized to close the contact or reed switch 5, a current path extending from the positive electrode of the battery 2 to the negative terminal thereof through the switch 50, lamp 6, lead wire 22, relay coil 4, contact or reed switch 5 and the ground is formed, so that the thermistor is prevented from being heated. In this manner, the relay 3 will serve to protect the thermistor.

FIG. 7 shows a structure implementing the circuit arrangement shown in FIG. 6. A casing 9 of an electrically conductive material is secured to an engine oil pan 10 through a copper ring 28 by means of a mounting member 32 and a clamping nut 34. The casing 9 is adapted to be inserted from a side wall of the oil pan and so disposed that the "UP" side thereof (FIG. 7) is located above with the "DOWN" side positioned below. Numeral 26 denotes an oil seal member formed of a silicon rubber and having a metal tube 48 at the inner side thereof. The casing 9 is formed with oil communicating holes 8A and 8B so that the thermistor installed in the casing 9 may be immersed in the engine oil in the normal condition. The seal member 26 is press-fitted into the casing 9 to assure the sealing against any further invasion of oil into the casing 9. In succession to the seal member 26, the resistor 11 whose one end has been previously connected with one end of the coil 4 and with one terminal of the contact or reed switch 5 is inserted together with the coil 4 and the switch 5. When, the other terminal of the resistor 11 is inserted through the metal tube 48 and soldered thereto to prevent the engine oil from entering through the tube 48. A connecting means 24 which may be composed of a metallic helical spring is attached to the other terminal end of the resistor 11. The thermistor 1 is inserted into the casing 9 from the tip end thereof with its one end inserted into the helical spring 24. The one end of the thermistor 1 is secured by fused solder to the other end of the resistor 11 in the helical spring 24. The connecting means 24 serves to reinforce the connection between the abutting ends of the resistor 11 and the thermistor 1. A cap 49 of electrically conductive material is secured at the tip end of the casing 9 by press-fitting with the other end of the thermistor 1 passed through the cap 49. After the cap 49 is secured to the casing 9 at the tip end thereof, the other end of the thermistor 1 is connected to the cap 49 by soldering. With the above structure, individual elements can be easily installed without being subjected to any appreciable mechanical stress.

The one end of the resistor 11 has been connected to the one end of the reed relay coil 4 and the one end of the reed switch 5 by means of a connecting member 30. The other end of the reed relay coil 4 is connected to a sleeve 47 sucured to the casing 9 through an interposed spacer 42 and thence connected to the lamp 6 (not shown in FIG. 7) through a lead wire 22. The reed relay coil 4 is secured around a coil bobbin 40. The other terminal of the switch 5 is connected to a portion of the casing 9 at 52. The connection between the reed switch and the reed relay coil is effected with the aid of a terminal plate 38 mounted on the bobbin 40, which is secured between the corner portion of the casing 9 having a reduced diameter, and a spacer 39. The spacer 42 is mounted on the spacer 39 with the upper end portion of the former being filled with epoxy resin 44. A sleeve 46 is embedded in the epoxy resin mass 44 in order to prevent the latter from being delaminated from the lead 22. The relay coil 4 and the relay contact 5 are unitarily housed within the casing 9 as shown in FIG. 7 so that only the single external lead 22 extending from the casing 9 is required, thereby to simplify the wiring arrangement of the apparatus.

The structure shown in FIG. 7 can be realized in a small size inexpensively, since the casing 9 and other elements can be easily fabricated from pipe-like materials. When the oil temperature rises, the temperature of the reed relay coil 4 will increase correspondingly, whereby erroneous operation can be prevented. The oil seal 26 may be made of a silicon rubber so as to exhibit a resiliency. Further, the terminal of the reed switch 5 extending into the interior of the casing 9 as well as the terminal of the thermistor at the side of the resistor 11 may be bent or turned so that these terminals may act as springs. By virtue of these features, stress produced by thermal expansion and contraction may be removed. The casing 9 is composed of two cylindrical portions of different diameters and the difference in diameter between these cylindrical portions is utilized to secure the bobbin 40. A convex protrusion 36 formed in the peripheral surface of the casing 9 serves as a seal against leakage of the engine oil in cooperation with a copper tube 28 upon mounting the detector assembly on the oil pan of the engine.

What is claimed is:

1. An apparatus for detecting a liquid level comprising:
    (a) a thermistor having a negative temperature coefficient of resistance;
    (b) an electromagnetic coil having a positive temperature coefficient of resistance;
    (c) connecting means for connecting said thermistor and said electromagnetic coil in series to each other;
    (d) means for supplying d.c. current to the series connection composed of said thermistor and said electromagnetic coil;
    (e) a container for accommodating therein a liquid, the level of which is to be detected;
    (f) first mounting means for fixedly mounting said thermistor to said container at a predetermined level to detect the level of said liquid;
    (g) second mounting means for fixedly mounting said electromagnetic coil on said container in a manner so that temperature of said liquid may be conducted to said electromagnetic coil; and
    (h) means for detecting current flowing through said thermistor and indicating whether the level of said liquid is at a normal level or not, said means for detecting including the electromagnetic coil and a contact actuated by said electromagnetic coil, connected to provide a bypass circuit for said thermistor when the current flowing in said electromagnetic coil reaches a predetermined level, said electromagnetic coil having a variable range of internal resistance which varies to compensate for variations in current flowing through said thermistor brought about by variations in temperature of said liquid thereby holding the current in the electromagnetic coil below the predetermined level until a predetermined overheat temperature is reached by said thermistor in the liquid; wherein said thermistor generates heat due to the current flowing therethrough as supplied from said d.c. current supply means, said thermistor thus exhibiting different temperatures in the states immersed in said liquid and exposed to air thereby to vary the resistance thereof in dependence upon whether said thermistor is positioned above or below said liquid level, said variations in resistance changing the current flowing through the thermistor and the coil to increase the current in the coil to the predetermined level of current to actuate the coil when the thermistor is above said liquid.

2. A liquid level detecting apparatus as set forth in claim 1, further comprising a warning lamp arranged in series connection between said d.c. current supply means and said electromagnetic coil for being energized in accordance with variations of temperature sensed by said thermistor.

3. A liquid level sensor, comprising:
    (a) a container for storing engine oil;
    (b) a cylindrical casing;
    (c) mounting means for fixedly mounting said cylindrical casing on said engine oil container;
    (d) a thermistor having a negative temperature coefficient of resistance;

(e) first connecting means for connecting one end of said thermistor to a tip end portion of said casing;

(f) holes formed in said case at said tip end portion for allowing said engine oil to enter said casing;

(g) a reed relay coil having a positive temperature coefficience of resistance and connected to the other end of said thermistor;

(h) a lead conductor for supplying current to said relay coil;

(i) means for securing an end of said lead conductor to said casing, said end being connected to said relay coil;

(j) a hollow bobbin for fixedly securing said relay coil;

(k) a reed switch mounted within the hollow space of said bobbin and adapted to constitute a bypass circuit for said thermistor upon the energization of said relay coil;

(l) oil seal means mounted between said bobbin of said reed relay coil and said thermistor;

(m) means for detecting current flowing through said thermistor thereby to indicate whether the liquid level of said engine oil is at a normal level.

4. A liquid level sensor as set forth in claim 3, wherein said coil and said thermistor are connected to each other through a resistor having a positive temperature coefficient of resistance and said oil seal means is provided between said thermistor and said resistor, said coil, said resistor and said thermistor being aligned along a straight path.

5. A liquid level sensor as set forth in claim 3, wherein said cylindrical casing is composed of a first casing portion having an enlarged diameter and a second casing portion having a reduced diameter, said first casing portion containing said coil bobbin, said second casing portion accommodating therein said resistor, said oil seal and said thermistor.

6. A liquid level sensor as set forth in claim 3, wherein said reed relay coil and said reed switch form a reed relay with said reed switch being actuated by said relay coil to constitute said bypass circuit for protecting said thermistor from damage due to overheating thereof.

7. A liquid level sensor as set forth in claim 6, wherein a warning lamp is connected in series with said relay coil in said lead conductor for supplying current to said relay coil.

* * * * *